(12) United States Patent
Pagliero

(10) Patent No.: US 6,381,854 B1
(45) Date of Patent: May 7, 2002

(54) BUSH-CUTTER FOR THE MANUAL MOWING OF GRASS AND THE LIKE

(75) Inventor: Francesco Carlo Pagliero, Via Pasquina No. 1, I-10080 Baldissero Canavese (Turin) (IT)

(73) Assignees: Dario Coero Borga, Turin; Franco Tonso, Montalenghe; Francesco Carlo Pagliero, Canvaese, all of (IT)

( * ) Notice: Subject to any disclaimer, the term of this patent is extended or adjusted under 35 U.S.C. 154(b) by 0 days.

(21) Appl. No.: 09/463,561
(22) PCT Filed: Jul. 30, 1998
(86) PCT No.: PCT/EP98/04756
  § 371 Date: Jun. 9, 2000
  § 102(e) Date: Jun. 9, 2000
(87) PCT Pub. No.: WO99/05899
  PCT Pub. Date: Feb. 11, 1999

(30) Foreign Application Priority Data

Jul. 31, 1997 (IT) .......................... TO97A0684

(51) Int. Cl.$^7$ ................................. B26B 7/00
(52) U.S. Cl. ................... 30/276; 30/275.4; 30/371; 30/289
(58) Field of Search .............. 30/371, 276, 275.4, 30/286, 277.4, 289

(56) References Cited

U.S. PATENT DOCUMENTS

| | | | | | |
|---|---|---|---|---|---|
| 3,931,676 A | * | 1/1976 | Merle | ............... | 30/371 |
| 4,658,506 A | * | 4/1987 | Nilsson | ............... | 30/371 |
| 4,756,084 A | * | 7/1988 | Morita | ............... | 30/276 |
| 4,827,617 A | * | 5/1989 | Shepherd | ............... | 30/371 |
| 4,890,389 A | | 1/1990 | Whitkop | ............... | 30/276 |
| 5,010,720 A | | 4/1991 | Corsi | ............... | 56/320 |
| 5,048,187 A | | 9/1991 | Ryan | ............... | 30/276 |
| 5,065,566 A | * | 11/1991 | Gates | ............... | 56/12.7 |
| 5,070,685 A | * | 12/1991 | Galt | ............... | 56/16.7 |
| 5,092,112 A | * | 3/1992 | Buckendorf, Jr. | ............... | 56/17.5 |
| 5,303,532 A | | 4/1994 | Phillips | ............... | 56/12 |
| 5,423,126 A | | 6/1995 | Byrne | ............... | 30/276 |

FOREIGN PATENT DOCUMENTS

| DE | 9112271 | 4/1992 |
|---|---|---|
| EP | 603982 | 6/1994 |

* cited by examiner

Primary Examiner—M. Rachuba
Assistant Examiner—Kim Ngoc Tran
(74) Attorney, Agent, or Firm—Keil & Weinkauf

(57) ABSTRACT

A bush-cutter for the manual moving of grass and the like comprises a rod or a stiff arm, working as a handle, which supports at one end a cutting head rotating around on axis and having cutting means with a cutting element, for example a blade or a flexible rope or the like, and engine means which make the cutting head rotate through gearing means. According to the invention, the bush-cutter comprises spacing means (13), including a spacer (14) which swings coaxially to said cutting head (11) around said axis (X—X) and which, during the mowing of the grass, selectively contacts any possible obstacle at a radial distance from the cutting head (11), that is longer than the radial extension of the cutting element of said cutting means (11.2), in respect of the head, in order to avoid the contact of said cutting element with the obstacle.

8 Claims, 2 Drawing Sheets

BUSH-CUTTER FOR THE MANUAL MOWING OF GRASS AND THE LIKE

The present invention relates to an improved bush-cutter for the mowing of grass and the like according to the first part of the main claim.

The well-known bush-cutter tools essentially include a rod or a stiff arm, working as a handle, that supports at one end a cutting head rotating around an axis and having cutting means with a cutting element, for example a blade or a flexible rope made of nylon or the like, and on the other end engine means, for example a combustion engine, which make the cutting head rotate through gearing mean.

In order to mow the grass, the operator grips the tool arm and moves forward, placing the cutting head near the ground and with its axis of rotation substantially orthogonal in respect of the same, while through manual control means he adjusts the speed of rotation of the engine and consequently the speed of rotation of the cutting head. The cutting means, rotating together with the cutting head, mow the grass very close to the ground.

However, often during the mowing the cutting means accidentally touch the base of trees and shrubs trunks, causing the unwelcome barking, or other obstacles with the damages that this implies. This is partially due to the particular structure of the cutting means, which do not allow the operator to perceive the right distance to be kept in order to avoid the barking or even the cutting of the trunks, if they are small stock shrubs. EP-A-0.603.982 discloses a bush-cutter which comprises spacing means, including a spacer which swings around an axis parallel to the axis around which the cutting head rotates.

According to U.S. Pat. No. 5,048,187 both axis of the spacer and the cutting head could be coincident.

In this bush-cutter the spacer is normally maintained in a working position in which, during the mowing of the grass, selectively contacts any possible obstacle at a radial distance from the cutting head, that is longer than the radial extension of the cutting element of said cutting means in respect of the head, avoiding the contact of said cutting element with the obstacle.

However, when the bush-cutter is handled according to the normal forward direction of its cutting head, the spacer maintained in its working position could affect negatively the mowing of the grass.

It is therefore the principal object of the present invention to provide an improved bush-cutter for the manual mowing of grass and the like, that allows to avoid the barking of trees and shrubs trunks and, anyhow, the contact of its cutting means with objects that have not to be damaged during the mowing, without negatively affecting the moving of the grass when the bush-cutter is handled according to the normal forward direction of its cutting head.

Another object of this invention is to provide an improved bush-cutter, the construction of which can be simplified and which is safe and reliable and easy and comfortable to be used.

With these objects in view, the present invention provides a bush-cutter for the mowing of grass and the like, whose essential characteristic is the subject of the characterizing part of the main claim, which should be regarded as incorporated here in its entirety.

Further advantageous features are described in the dependent claims.

The present invention will become clearer in the following detailed description, with reference to the attached drawings, which are provided purely by way of non-restrictive example, in which.

Figure 1:
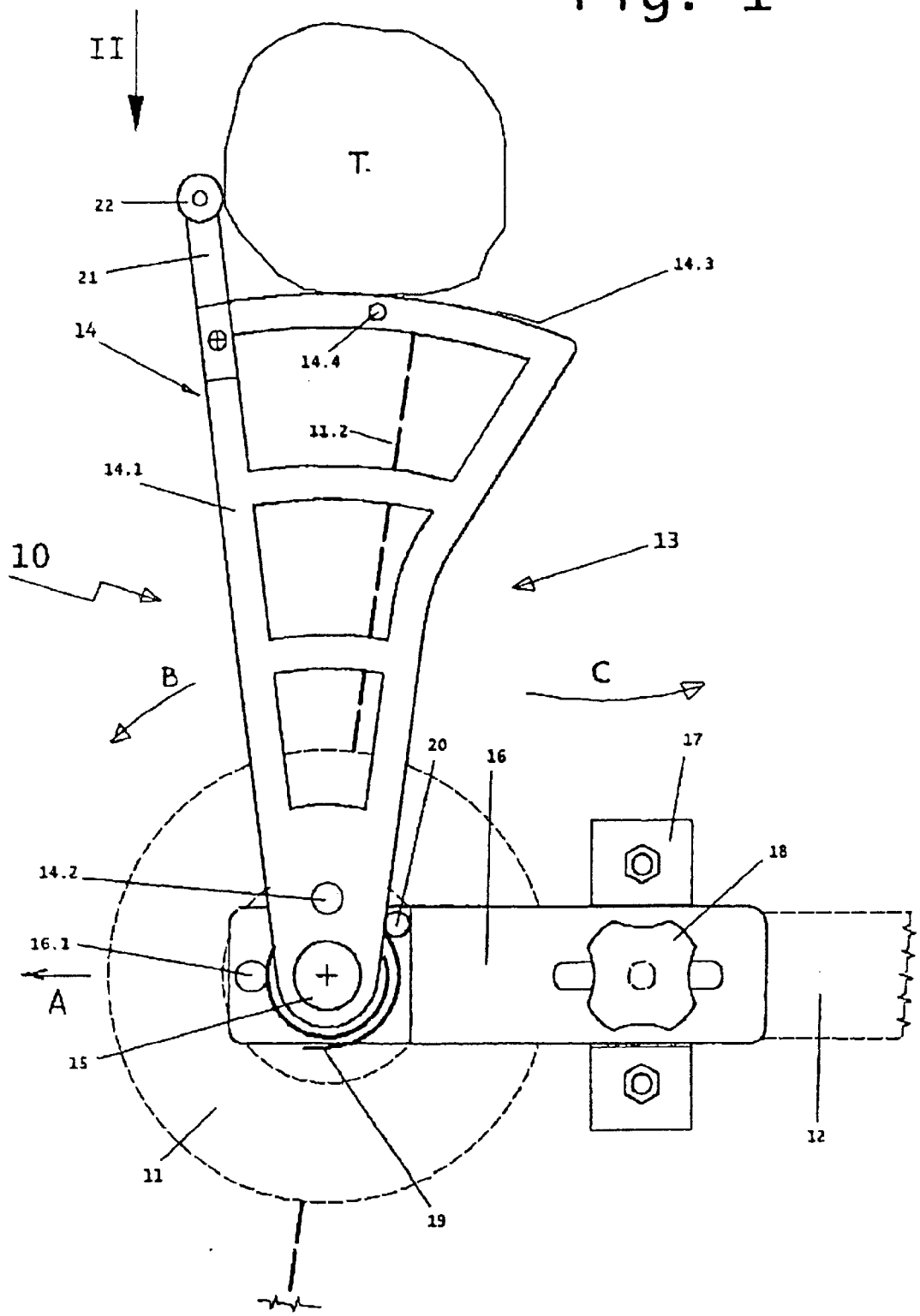
FIG. 1 is a partial plan top view of the bush-cutter for the manual mowing of crass and the like according to an embodiment of th e present invention.

In the drawings, the numeral 10 indicates a bush-cutter for the manual mowing of grass and the like, that incorporates the principles of the present invention and that is only partially illustrated (as it will be more clear in the following part) for clarity reasons.

Figure 2:
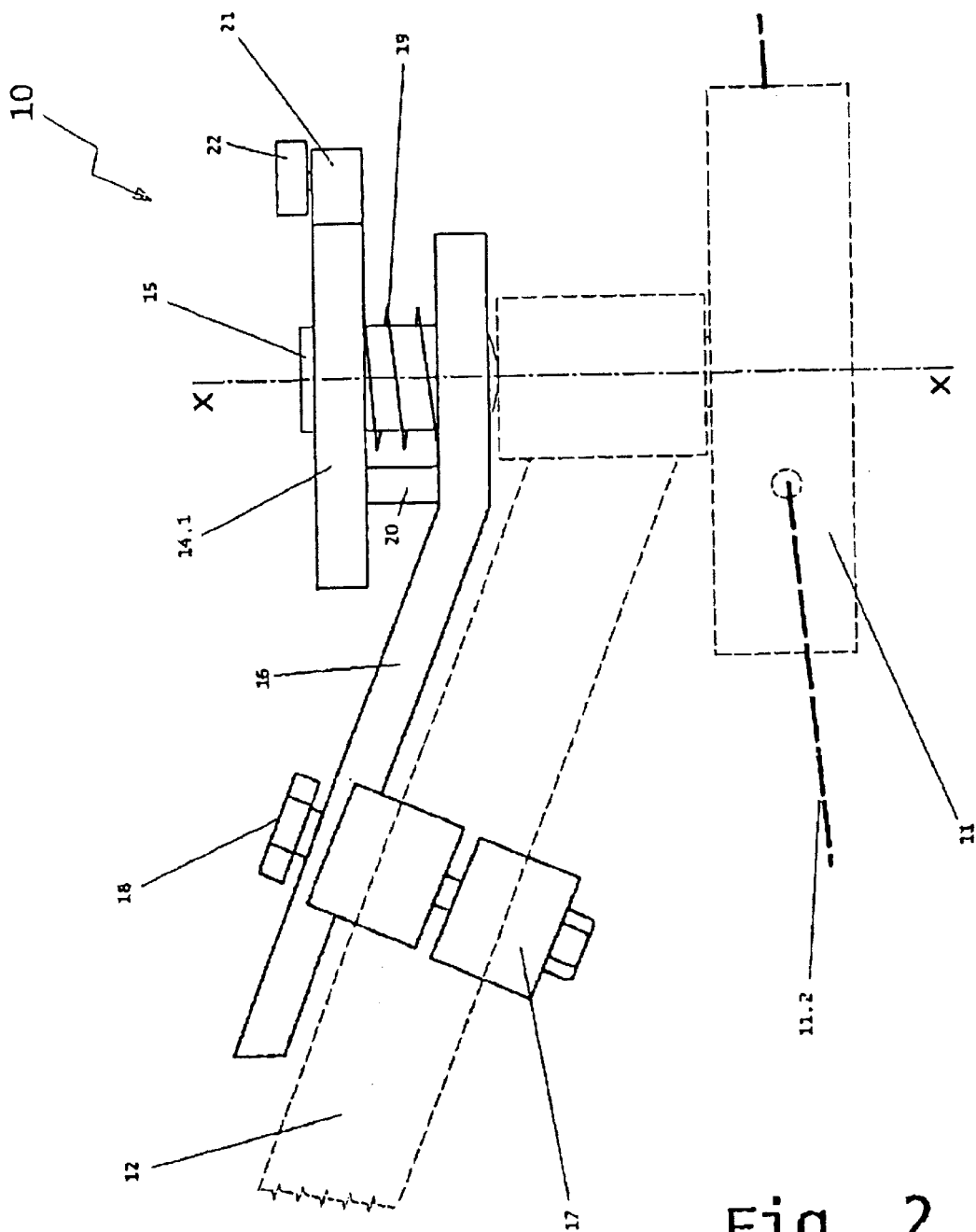
FIG. 2 is a side elevation view in direction of arrow II in FIG. 1.

This bush-cutter 10 includes a cutting head 11 supported at one end of a stiff handle arm 12 and rotating around an axis X—X (FIG. 2), which during the mowing is positioned substantially orthogonal in respect of the ground. (Head 11 and arm 12 are illustrated with dotted lines for clarity reasons).

The cutting head 11 has cutting means 11.2, which include a cutting element comprising a nylon flexible rope, which is substantially outstretched—according to a diametrical direction—from opposite ends of the head (also said cutting means 11.2 are illustrated with dotted lines).

The cutting head 11 rotates, together with the cutting means 11.2, through engine means (well-known and therefore not illustrated) fastened at the other end of the handle arm 12 (also not illustrated), According to the present invention, in the bush-cutter 10 there are provided spacing means 13 (FIG. 1) including a spacer 14, that swings coaxially to the cutting head 11 around the said axis X—X and, during the mowing of the grass, contacts selectively any possible obstacle at a radial distance from the cutting head 11 that is longer than the radial extension of the cutting element of the cutting means 11.2, in order to avoid the contact of this cutting element with the obstacle.

The spacer 14 consists of a swinging blade 14.1, substantially like a sector of a circle (plan view, FIG. 1). This swinging blade 14.1 is pivoted at the center on a pin 15 coaxially supported above the cutting head 11 through a bracket 16, which is arranged, in part, on said head 11 and that extends, in part, along the handle arm 12.

Said bracket 16 is fastened, in a dismountable way, to the said arm 12 through clamping means 17 with a securing screw 18.

The blade 14.1 is made of a light material, e.g. plastic material, wood or metallic alloy, and it has some lightening holes. Also the bracket, the clamping means and the securing screw can be made of the same materials.

Spring means 19, for example a helical spring, working as return spring, are arranged between the bracket 16 and the swinging blade 14.1. Said spring means 19 normally keep the blade 14.1 swung around the pin 15 in a rest position (as in FIG. 1), in which the blade—during the mowing of the grass—does not touch any possible obstacle before the cutting element of the cutting means 11,2, if the bush-cutter 10 is handled according to the normal forward direction of the cutting head 11 (as indicated with the arrow A in FIG. 1).

A fixed projection 20 juts out towards the top from the bracket 16 near the pin 15 and allows the blade 14.1 to stop, when it has been automatically swung in the rest position due to the action of the return spring means 19.

Starting from the said rest position, the blade 14.1 can be swung around the pin 15 (for example, counterclockwise, as indicated with the arrow B in FIG. 1) according to a circumference arc of at least 180°, in contrast with the action of the said return spring means 19.

In said swinging blade 14.1 there is provided a clearance hole 14.2, the axis of which is parallel to the axis X—X and which is arranged in proximity to the pin 15.

In the bracket 16, near the pin 15, there is provided a hole 16.1, the axis of which is parallel to the axis X—X and which axially corresponds to the hole 14.2 of the blade 14.1 when said blade has been swung around the pin 15 in the direction shown by the arrow B, starting from its rest position up to an intermediate working position, setting it substantially as an extension of the handle arm 12, that is making it rotate for a circumference arc substantially of 90°. In that working position, the blade 14.1 can be fixed in a discountable way to the bracket 16 and, therefore, to the handle arm 12, through the insertion of a set pin or a cotter pin (not illustrated) in the mentioned holes 14.2/16.1, which are axially aligned each other.

Fixed in that working position, the blade 14.1 works as a fixed spacer in respect of the cutting head 11 and, when put against a linear obstacle, e.g. a wall or a hedge, it allows to mow the grass following with the bush-cutter 10 the shape of the obstacle, thus avoiding that the cutting means 11.2 touch the same.

When the pin is extracted from the holes 14.2/16.1, the blade 14.1 will be automatically swung into its rest position due to the action of the return spring means 19.

As clearly illustrated in FIG. 1, the swinging blade 14.1 has a contact radial finger 21, that is removable and that projects outside one end of its external curvilinear edge 14.3 (precisely, the front end of the edge 14.3 in the rotation direction around the pin 15, according to the arrow B). Said contact finger 21 supports, on its free end, a roller 22 that freely rotates around an axis substantially parallel to the axis X—X.

By this arrangement, in order to mow the grass with the bush-cutter 10 around an obstacle, the profile of which is curvilinear, for example a tree trunk T (FIG. 1), after having fixed the finger 21, the swinging blade 14.1 (automatically swung into its rest position) is to be put against the obstacle T in two points, that is by means of the roller 22 and a part of its curvilinear edge 14.3. Then, still keeping this two contact points condition, the cutting head 11 is moved along a revolution arc around the obstacle (for example, counter-clockwise as indicated from the arrow C in FIG. 1), through the handle arm 12. During said movement of the cutting head 11 the blade 14.1, working as swinging spacer, rotates around the pin 15 on a circumference arc even of 180° (according to the direction of the arrow B, starting, for example, from its rest position), while it follows the obstacle profile, in order to allow the cutting means 11.2 to mow the surrounding grass without any contact with the obstacle (for example, without any barking of the T trunk), As regards the correct measuring of the cutting element of the cutting means 11.2 in respect of the swinging blade 14.1 (so that the radial extension of said element from the cutting head 11 is as large as possible while it has to be smaller than the radial distance kept between the head and the obstacle through the blade 14.1), in an area of the blade 14.1 near to its outer edge there is provided a locating and inspection clearance hole 14.4, the axis of which is substantially parallel to the axis X—X. During the setting up of the bush-cutter 10, through said hole 14.4 the operator looks at each end of the cutting element of the cutting means 11.2 and checks that it meets the axis of that hole. In the negative, he has to measure the radial extension of said element in respect of the cutting head, placing the free end of the element on the axis of the hole 14.4.

As will be clear from the foregoing, the spacer means 13 according to the present embodiment of the invention consist of a fitting, that can be assembled to a conventional bush-cutter through the attaching means 16 and fastening means 17 and 18, which allow it to be adjusted in the longitudinal direction of the handle arm 12, in order to assure the correct coaxiality between the swinging spacer 14 and the cutting head 11.

In practice, of course, many variants may be made of what has been described and illustrated purely by way of non-restrictive example, without thereby departing from the scope of the invention.

For example, the spacer means can be assembled into the structure of the bush-cutter according to the principles of the present invention.

What is claimed is:

1. Bush-cutter for the manual mowing of grass, in which a rod or a stiff arm (12), working as a handle, supports at one end a cutting head (11) rotating around an axis (X—X) and having a cutting device with a cutting element, and in which an engine makes the cutting head rotate through gears, comprising a spacing device (13), including a spacer (14) which swings coaxially to said cutting head (11) around said axis (X—X) and which, during the mowing of the grass, may be brought into contact with any possible obstacle determining a radial distance of the obstacle from the cutting head (11), that is longer than the radial extension of the cutting element of said cutting device (11.2) in respect of the head, in order to avoid the contact of said cutting element with the obstacle, characterized in that said spacing device (13) includes a spring (19), which normally maintains said spacer (14) in a rest position—swung around said axis (X—X)—, in which the spacer—during the mowing of the grass— does not touch any possible obstacle before the cutting device (11.2), when the bush-cutter (10) is handled according to the normal forward direction of its cutting head (11), and in which the cutting element consists of a flexible rope, said bush-cutter further comprising a locating and inspection device (14.4) for the correct measuring of extending ends of the cutting element of said cutting device (11.2) in respect of the spacer (14), and characterized in that said locating and inspection device (14.4) includes a clearance hole in proximity to the outer edge (14.3) of said spacer (14) and distal from said axis (X—X), through which hole the operator, during the setting up of the bush-cutter, looks at each end of the cutting element of said cutting device (11.2) and checks that it meets the axis of that hole and, if not, he correctly sets the axis of extension of the end of the said cutting element in respect of the cutting head, unwinding partially the cutting element.

2. Bush-cutter for the manual mowing of grass, in which a rod or a stiff arm (12), working as a handle, supports at one end a cutting head (11) rotating around an axis (X—X) and having a cutting device with a cutting element, and in which an engine makes the cutting head rotate through gears, comprising a spacing device (13), including a spacer (14) which swings coaxially to said cutting head (11) around said axis (X—X) and which, during the mowing of the grass, may be brought into contact with any possible obstacle determining a radial distance of the obstacle from the cutting head (11), that is longer than the radial extension of the cutting element of said cutting device (11.2) in respect of the head, in order to avoid the contact of said cutting element with the obstacle, characterized in that said spacing device (13) includes a spring (19), which normally maintains said spacer (14) in a rest position—swung around said axis (X—X)—, in which the spacer—during the mowing of the grass— does not touch any possible obstacle before the cutting device (11.2), when the bush-cutter (10) is handled according to the normal forward direction of its cutting head (11), and in which said spacing device (13) includes an engagement or contact device (14.3, 21, 22) of said spacer (14), through which the spacer contacts an obstacle, and keeping the contact condition, while the cutting head (11) is moved substantially along a revolution arc around the obstacle—through the handle arm (12)—, said spacer (14), working as a swinging spacer, rotates around the axis (X—X) for a circumference arc, following the obstacle profile, so that the cutting device (11.2) can mow surrounding grass without touching the obstacle, and characterized in that said spacing or contact device (14.3, 21, 22) of the spacer (14) includes a finger (21), which is connected in a dismountable way and that juts out in respect of the outer edge of the spacer.

3. The bush-cutter of claim 2, characterized in that said finger (21) has, on its free end, a roller (22), that freely rotates around an axis substantially parallel to said axis (X—X).

4. Bush-cutter for the manual mowing of grass, in which a rod or a stiff arm (12), working as a handle, supports at one end a cutting head (11) rotating around an axis (X—X) and having a cutting device with a cutting element, and in which an engine makes the cutting head rotate through gears, comprising a spacing device (13), including a spacer (14) which swings coaxially to said cutting head (11) around said axis (X—X) and which, during the mowing of the grass, may be brought into contact with any possible obstacle determining a radial distance of the obstacle from the cutting head (11), that is longer than the radial extension of the cutting element of said cutting device (11.2) in respect of the head, in order to avoid the contact of said cutting element with the obstacle, characterized in that said spacing device (13) includes a spring (19), which normally maintains said spacer (14) in a rest position—swung around said axis (X—X)—, in which the spacer—during the mowing of the grass—does not touch any possible obstacle before the cutting device (11.2), when the bush-cutter (10) is handled according to the normal forward direction of its cutting head (11), in which the cutting element consists of a flexible rope wound in the cutting head (11), wherein the cutting element has a first end and a second end which extend from the cutting head (11) in opposite directions, the radial extension of each end of said cutting element being selectively set by an operator, and characterized in that the bush-cutter includes a locating and inspection device (14.4) for the correct measuring of the extending ends of the cutting element of said cutting device (11.2) in respect of the spacer (14), and which allow the operator to check that the radial extension of each end of said cutting element from the cutting head (11) is as large as possible, but smaller than the radial distance that the spacer (14) keeps between said head and an obstacle, and to correctly set the radial extension of each end of said cutting element, when necessary.

5. The bush-cutter of claim 4, characterized in that said locating and inspection device (14.4) includes a clearance hole in proximity to the outer edge (14.3) of said spacer (14) and distal from said axis (X—X), through which hole the operator, during the setting up of the bush-cutter, looks at each end of the cutting element of said cutting device (11.2) and checks that it meets the axis of that hole and, if not, he correctly sets the axis of extension of the end of the said cutting element in respect of the cutting head, unwinding partially the cutting element.

6. Bush-cutter for the manual mowing of grass, in which a rod or a stiff arm (12), working as a handle, supports at one end a cutting head (11) rotating around an axis (X—X) and having a cutting device with a cutting element, and in which an engine makes the cutting head rotate through gears, comprising a spacing device (13), including a spacer (14) which swings coaxially to said cutting head (11) around said axis (X—X) and which, during the mowing of the grass, may be brought into contact with any possible obstacle determining a radial distance of the obstacle from the cutting head (11), that is longer than the radial extension of the cutting element of said cutting device (11.2) in respect of the head, in order to avoid the contact of said cutting element with the obstacle, characterized in that said spacing device (13) includes a spring (19), which normally maintains said spacer (14) in a rest position—swung around said axis (X—X)—, in which the spacer—during the mowing of the grass—does not touch any possible obstacle before the cutting device (11.2), when the bush-cutter (10) is handled according to the normal forward direction of its cutting head (11), and characterized in that said spacer (14) consists of a swinging blade (14.1).

7. The bush-cutter of claim 6, in which said spacing device (13) is embodied in a fitting that is assembled in a dismountable way, characterized in that said spacing device (13) includes a spacer (14), pivoted on a pin (15) supported coaxial above the cutting head (11) through a bracket (16), which is partially arranged on the cutting head (11) and partially extends along the handle arm (12); said bracket (16) is fastened in a dismountable way to the arm (12).

8. The bush-cutter of claim 3, wherein the bracket (16) is fastened to the arm (12) through a clamp (17) with a securing screw (18).

* * * * *

UNITED STATES PATENT AND TRADEMARK OFFICE
CERTIFICATE OF CORRECTION

PATENT NO. : 6,381,854 B1
DATED : May 7, 2002
INVENTOR(S) : Francesco Carlo Pagliero It is certified that error appears in the above-identified patent and that said Letters Patent is hereby corrected as shown below:

<u>Column 6,</u>
Line 51, "claim 3" should be -- claim 7 --.

Signed and Sealed this

Twenty-fifth Day of June, 2002

*Attest:*

*Attesting Officer*

JAMES E. ROGAN
*Director of the United States Patent and Trademark Office*